K. KNOBLOCH.
ELECTRIC STORAGE BATTERY.
APPLICATION FILED MAY 18, 1914.
1,129,690.
Patented Feb. 23, 1915.
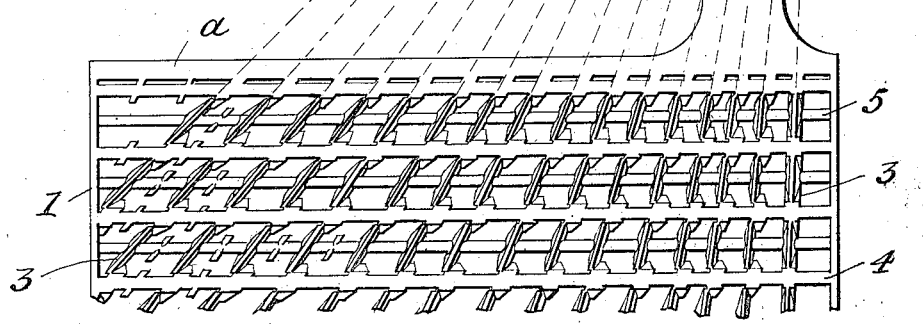
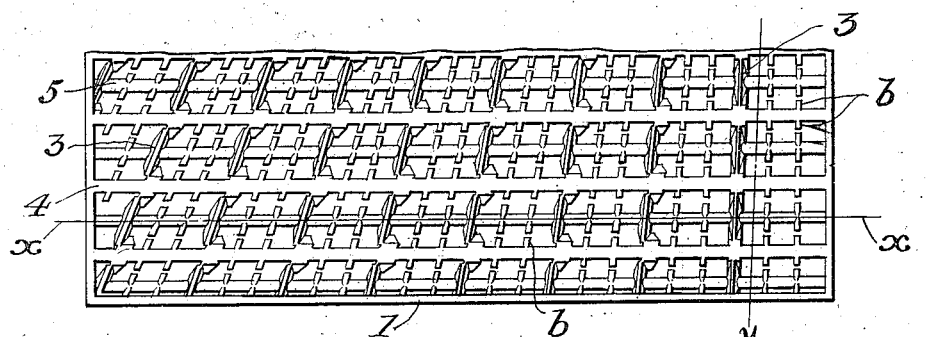
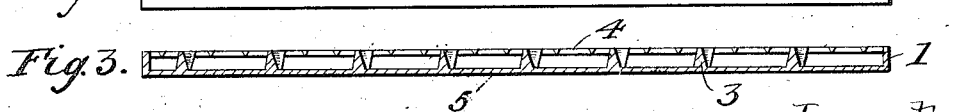
Inventor:
Karola Knobloch,
by G. H. & W. T. Howard,
Attorneys.
Witnesses:
Porter H. F. Lauth,
Sarah Schotta.

UNITED STATES PATENT OFFICE.

KAROLA KNOBLOCH, OF BALTIMORE, MARYLAND, ASSIGNOR, BY MESNE ASSIGNMENTS, TO THE STORAGE BATTERY APPLIANCE COMPANY, OF BALTIMORE, MARYLAND, A CORPORATION OF MARYLAND.

ELECTRIC STORAGE BATTERY.

1,129,690.

Specification of Letters Patent.

Patented Feb. 23, 1915.

Application filed May 18, 1914. Serial No. 839,190.

*To all whom it may concern:*

Be it known that I, KAROLA KNOBLOCH, a citizen of the United States of America, and resident of Baltimore, Maryland, have invented certain Improvements in Electric Storage Batteries, of which the following is a specification.

This invention relates to certain improvements in the construction of the grid with the view to increase the life and efficiency of the battery; and it consists principally in making the conducting ribs of the grid straight from end to end, and in arranging the same in lines which if sufficiently extended, would converge at a single point exterior of or beyond the frame of the grid.

In the further description of the said invention which follows, reference is made to the accompanying drawing forming a part hereof, and in which:—

Figure 1 is a face or plan view of the improved grid with the central portion thereof removed; and Fig. 2 an exterior edge view of the same. Fig. 3 is a section of Fig. 1 taken on the broken line $x$—$x$, and Fig. 4 is a section of the same figure taken on the broken line $y$.

Referring now to the drawing, 1 is the rectangular frame of the grid, and 2 the electric terminal which extends from the end $a$ of the frame, and is formed as a part thereof.

3, 3 are the conducting ribs which connect the end portions of the frame; and they are angularly placed so that should they be extended beyond the end $a$ of the frame, as shown by the broken lines in Fig. 1, they would converge at the imaginary point $o$, which is as before stated exterior of, or beyond the frame 1.

By the construction described electric currents are drawn from all parts of the grid and conducted independently to and distributed along the portion of the frame having the terminal 2; and this without materially departing from a uniform content of the bodies of active material as would be the case were the ribs to converge at a point within the frame.

4 and 5 are the upper and the lower bars which serve to support the conducting ribs 3, and also to sustain bodies of active paste (not shown) between them; and to better adapt them for the latter function, they are "staggered" and provided with the projections $b$ before briefly referred to, which projections when the grid is charged with the said paste, are partially inclosed therein.

By reference to Figs. 1 and 3 it will be seen that the conducting ribs are not of a uniform shape in cross section throughout their length, but this construction is not employed to effect any useful purpose, but merely to admit of the easy withdrawal of the pattern of the grid from the sand in the molding operation.

I have shown and described what to me appears to be the best form and construction of the grid, but it will be readily understood that many changes can be made in its construction, without affecting the nature of the invention.

I claim as my invention:—

1. In a storage battery grid, a frame, conducting ribs in the frame arranged in converging lines leading to a point which is exterior of or beyond the grid, combined with supporting bars for the ribs which extend transversely of the same, the said bars being flush with the upper and lower edges of the frame and provided with laterally extending projections.

2. In a storage battery grid, the conducting ribs thereof arranged in converging lines leading toward a point which is exterior of or beyond the grid, combined with upper and lower supporting bars which are "staggered" placed directly over each other as seen in cross section.

KAROLA KNOBLOCH.

Witnesses:
 JULIA B. ROBINSON,
 WM. T. HOWARD.